United States Patent [19]

Chigira

[11] Patent Number: 5,298,933
[45] Date of Patent: Mar. 29, 1994

[54] IMAGE PICKUP APPARATUS

[75] Inventor: Tatsuo Chigira, Yokohama, Japan

[73] Assignee: Canon Kabushiki Kaisha, Tokyo, Japan

[21] Appl. No.: 875,681

[22] Filed: Apr. 29, 1992

[30] Foreign Application Priority Data

May 2, 1991 [JP] Japan .................. 3-100743

[51] Int. Cl.⁵ .................. G03B 5/00; G03B 13/36; G02B 7/10
[52] U.S. Cl. .................. 354/400; 354/195.1; 359/698; 348/357
[58] Field of Search .................. 354/400, 195.1, 195.12; 358/227; 359/696, 697, 698, 823, 824

[56] References Cited

U.S. PATENT DOCUMENTS

| | | | |
|---|---|---|---|
| 4,735,494 | 4/1988 | Makino et al. | 359/698 X |
| 4,772,909 | 9/1988 | Ogasawara | 354/400 |
| 4,920,420 | 4/1990 | Sano et al. | 358/227 |
| 4,950,054 | 8/1990 | Wada et al. | 358/227 X |
| 5,028,945 | 7/1991 | Kashihara et al. | 354/195.1 |
| 5,157,432 | 10/1992 | Fukuoka et al. | 354/400 |
| 5,164,756 | 11/1992 | Hirasawa | 354/400 |
| 5,172,149 | 12/1992 | Sekiguchi et al. | 354/195.1 |
| 5,185,669 | 2/1993 | Kato | 358/227 |
| 5,200,860 | 4/1993 | Hirasawa et al. | 359/696 |
| 5,223,981 | 6/1993 | Kaneda | 359/698 |

Primary Examiner—W. B. Perkey
Attorney, Agent, or Firm—Robin, Blecker, Daley & Driscoll

[57] ABSTRACT

A video camera comprises: a stepping motor to drive a photographing lens; a stepping motor driving circuit; and a control circuit to control the stepping motor driving circuit in correspondence to the position of the photographing lens. When the driving of the photographing lens is started, the control circuit sets a stepping motor driving frequency in correspondence to the position of the photographing lens. When the set frequency is equal to or higher than a predetermined frequency, the stepping motor driving circuit is controlled and a rectangular waveform output of a large duty ratio is supplied to the stepping motor for a predetermined period of time from the actuation of the stepping motor. After the elapse of the predetermined time, an almost smooth waveform output of the set frequency corresponding to the position of the photographing lens is supplied to the stepping motor.

19 Claims, 5 Drawing Sheets

IMAGE PICKUP APPARATUS

BACKGROUND OF THE INVENTION

1. Field of the Invention

The invention relates to an image pickup apparatus such as a video camera having recording means or the like, in which the position of a photographing lens on the optical axis is moved by a stepping motor.

2. Related Background Art

In a recent image pickup apparatus (hereinafter, referred to as a video camera) such as a video camera or the like, in order to reduce the size and weight, in place of a conventional zoom lens in which a magnification changing lens and a focusing lens are interlockingly actuated by a cam ring, there is used a zoom lens of what is called an electronic cam system in which the cam ring is omitted and the magnification changing lens and the focusing lens are respectively driven by independent motors so as to keep a predetermined relation.

Nowadays, in the video camera having such a zoom lens, generally, the magnification changing lens is driven by a DC motor and the focusing lens is driven by a stepping motor.

However, since the vibration and noises of the stepping motor are larger than those of the DC motor, in the conventional video camera using the stepping motor, there is a problem such that the driving sound of the lens by the stepping motor is recorded as noises onto the video tape through a microphone of the video camera.

One technical means for solving the drawbacks as mentioned above is disclosed in Japanese Patent Publication No. 52-24649. The above technical means relates to what is called a microstep driving in which by controlling the power supply to a stepping motor, a rotor can be stopped at a pitch which is finer than the stop position of the rotor that is determined by the number of phases and the number of magnetizations of the rotor. Since the current supply to the coil almost smoothly changes even during the rotation, the occurrence of the harmful vibration and noises can be prevented.

However, when the lens is driven by the stepping motor using the current supplying method as mentioned above, an output torque of the stepping motor decreases as compared with that in the case where a rectangular wave shaped current is supplied. Therefore, the stepping motor of a larger electric power or a large shape is needed. There are problems such that a battery as a power source of a video camera is rapidly consumed and the realization of the small size and light weight of the video camera is obstructed.

As a technique to prevent the consumption of the battery and to drive the lens by a small motor, a combination with the means disclosed in Japanese Patent Publication No. 53-25085 is also considered. According to such a combination technique, the current supply waveform is changed in accordance with whether the stepping motor is driven at a high speed or a low speed. According to such a method, however, when the stepping motor is driven at a high speed, the current is supplied by a waveform which is closer to the rectangular wave. Consequently, there is a problem such that the occurrence of the vibration and noises cannot be prevented in the high-speed driving operation in which the vibration and noises are largest.

SUMMARY OF THE INVENTION

The present invention is made to solve the above problems and it is the first object of the invention to provide an image pickup apparatus in which by using a small stepping motor, an electric power consumption is small, enough activating torque and a predetermined driving speed are obtained, the occurrence of the vibration and noises is suppressed, and it is prevented that the vibration and noises become an obstacle of the recording.

The second object of the invention is to provide an image pickup apparatus in which a driving frequency and a driving waveform of a stepping motor to drive a photographing lens are controlled in accordance with a driving state of the photographing lens, thereby enabling the lens to be smoothly controlled.

To accomplish the above objects, according to a preferred embodiment of the invention, there is disclosed an image pickup apparatus comprising a lens; a stepping motor to drive the lens; first control means for determining a driving frequency of a driving signal of the stepping motor; and second control means for variably changing a driving waveform of the driving signal in accordance with whether the driving frequency determined by the first control means is equal to or higher than a predetermined frequency or not.

According to a preferred embodiment of the invention, there is disclosed a video camera comprising: a photographing lens a motor to drive the photographing lens; first control means for determining a driving speed of the motor on the basis of the operating position of the photographing lens; and second control means for variably changing a driving waveform of a driving signal of the motor in accordance with whether the driving speed determined by the first control means is equal to or higher than a predetermined speed or not.

According to another preferred embodiment of the invention, there is disclosed a video camera comprising: a focusing lens; a stepping motor to drive the focusing lens a table in which a driving speed of the focusing lens according to the positions of the zoom lens and the focusing lens is stored; speed control means for selecting the driving speed of the focusing lens from the table on the basis of the positions of the zoom lens and the focusing lens; and driving characteristics control means for variably changing a driving waveform of the driving signal in accordance with whether the driving speed determined by the first control means is equal to or larger than a predetermined value.

The above and other objects and features of the present invention will become apparent from the following detailed description and the appended claims with reference to the accompanying drawings.

DETAILED DESCRIPTION OF THE PREFERRED EMBODIMENT

An image pickup apparatus according to an invention will now be described hereinbelow with respect to an embodiment.

Figure 1:
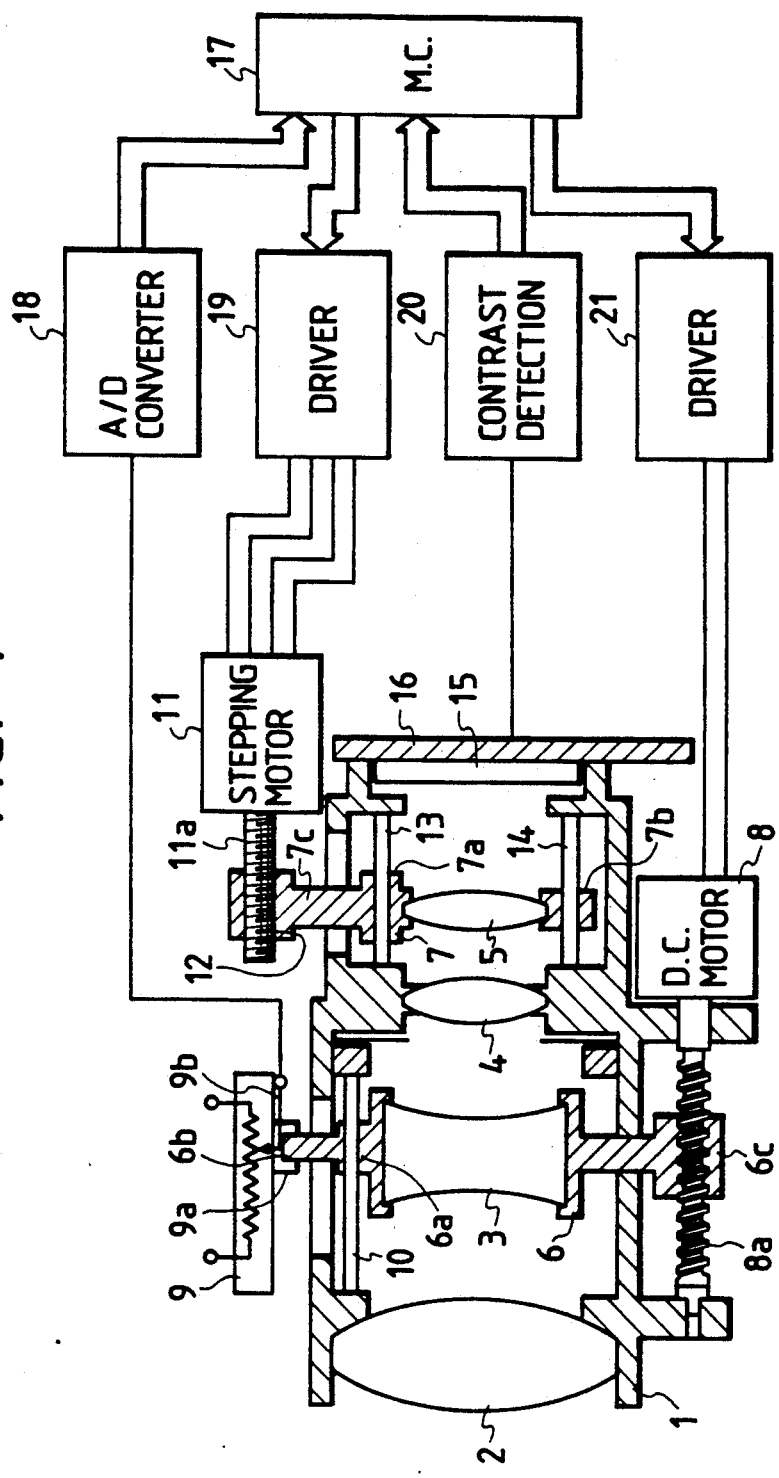
FIG. 1 is a block diagram of an embodiment of the present invention.
Figure 2:
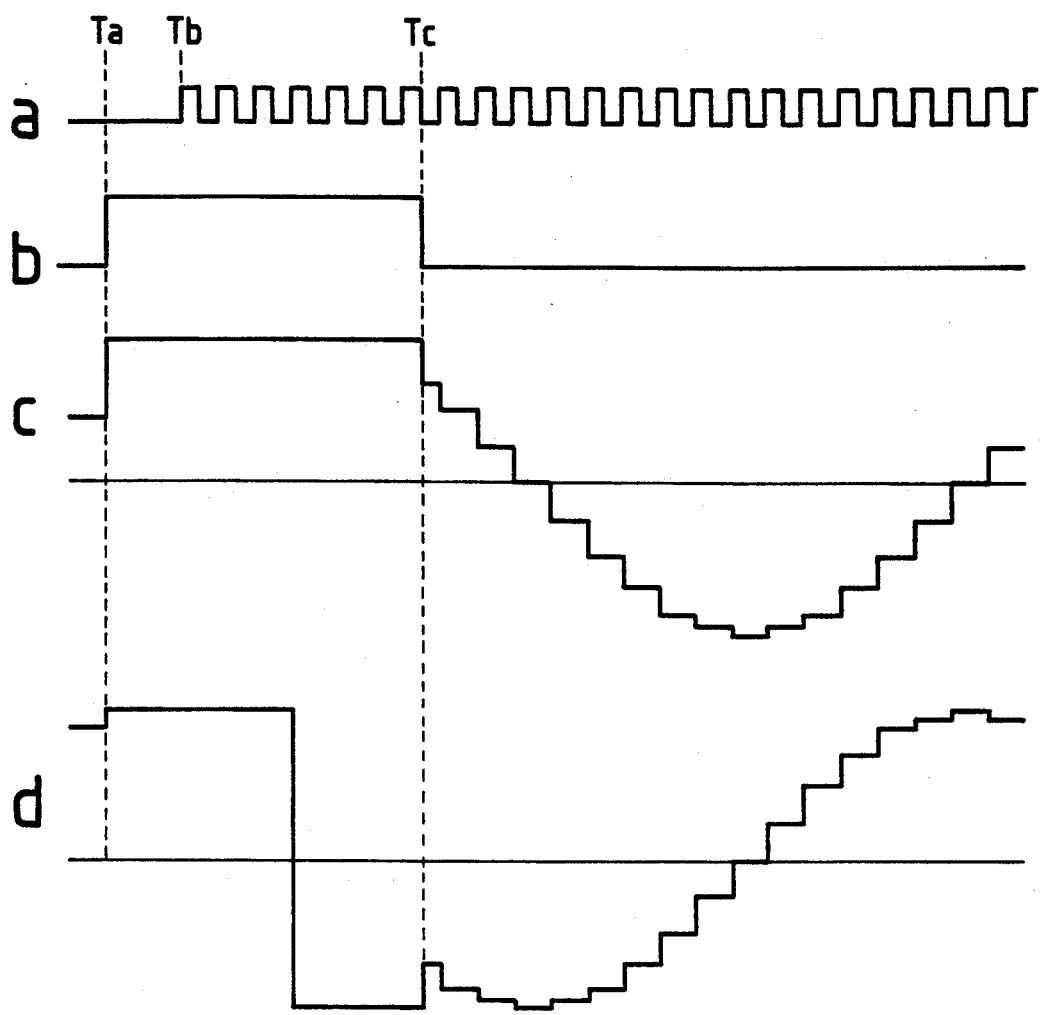
FIG. 2 is a timing chart for a stepping motor driving circuit according to the embodiment.
Figure 3:
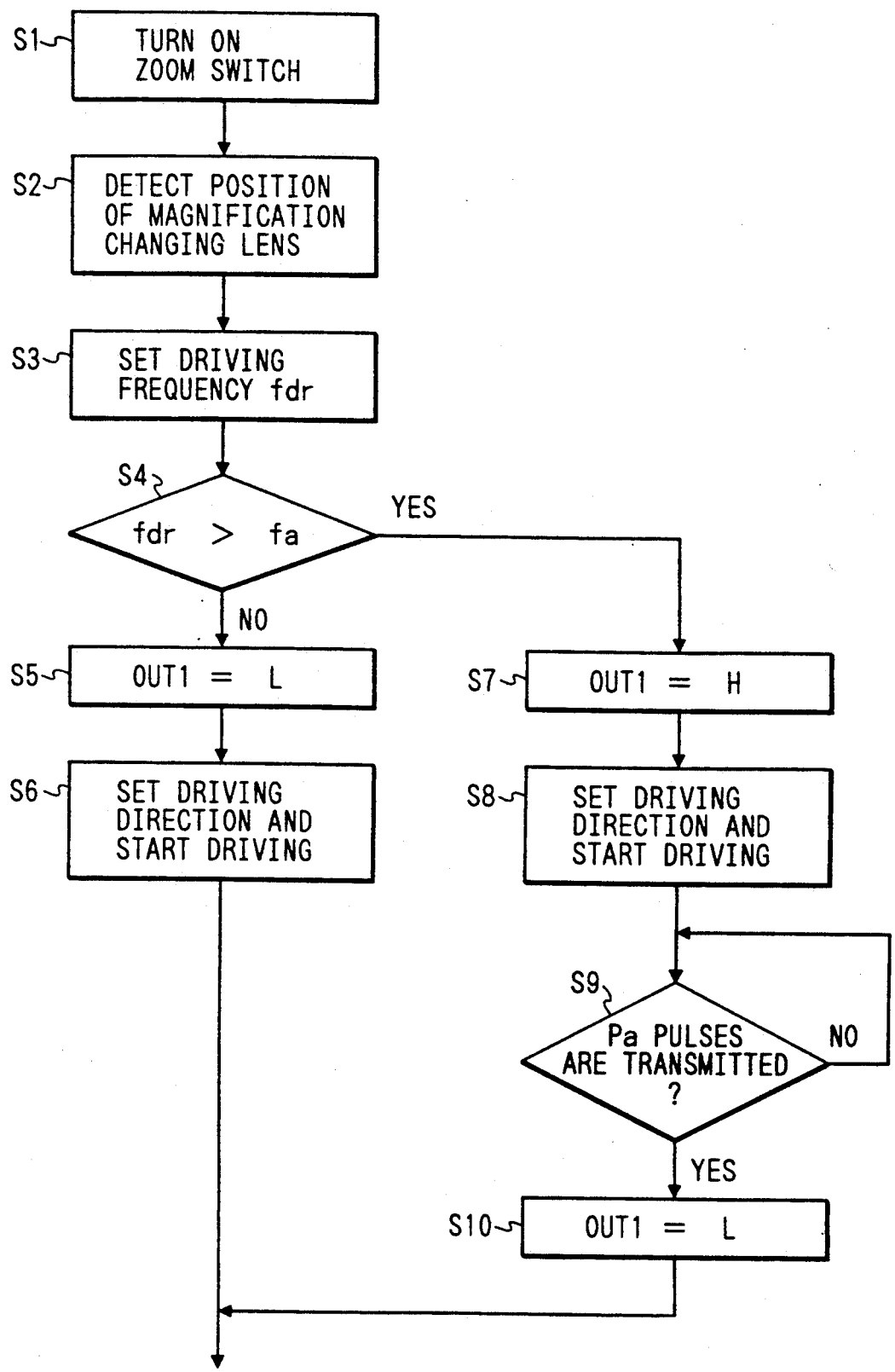
FIG. 3 is a flowchart for the zooming operation of the embodiment.

FIG. 1 is a block diagram showing a construction of an embodiment according to the invention. FIG. 2 is an explanatory diagram showing a waveform of a current which is supplied to a stepping motor in the embodiment. FIG. 3 is a flowchart showing the operation of the embodiment.

In FIG. 1, reference numeral 1 denotes a first lens barrel; 2, 3, 4 and 5 indicate photographing lenses; 3 a magnification changing lens; 5 a focusing lens; 6 a second lens barrel; 7 a third lens barrel; 8 a DC motor; 9 a potentiometer; 10 a first guide bar; 11 a stepping motor of the double phase type for moving the position of the photographing lens 5; 12 a screw portion of the third lens barrel; 13 and 14 second and third guide bars; 15 a CCD as an image pickup device; 16 a CCD folder; 17 a microcomputer; 18 an A/D converter; 19 a stepping motor driving circuit; 20 a contrast detection circuit; and 21 a DC motor driving circuit.

The first photographing lens 2, third photographing lens 4, DC motor 8, potentiometer 9, first, second and third guide bars 10, 13 and 14, stepping motor 11, and CCD holder 16 to which the CCD 15 is fixed, are fixed to the first lens barrel 1.

The second lens barrel 6 holds the magnification changing lens 3 and has a bearing portion 6a. The bearing portion 6a is fitted to the first guide bar 10 fixed to the first lens barrel 1. The second lens barrel 6 is supported to the first lens barrel 1 so as to be movable in the optical axis direction. A screw of portion 6c is provided for the second lens barrel 6 at a position which is almost symmetrical to the bearing portion 6a with respect to the optical axis. The screw portion 6c comes into engagement with a lead screw 8a which is integratedly provided on an output shaft of the DC motor 8 fixed to the first barrel. The second lens barrel 6 is driven in the optical axis direction by the rotation of the DC motor 8. Further, the second lens barrel 6 has a projection portion 6b. The projection portion 6b is fitted into a concave portion formed in a slider portion 9a of the potentiometer 9. A voltage according to the position of the second photographing lens 3 is generated to an output terminal 9b of the potentiometer 9.

The fourth photographing lens 5 as a focusing lens is fixed to the third lens barrel 7. A first bearing portion 7a, a second bearing portion 7b, and an expanding portion 7c are provided for the third lens barrel 7. The first bearing portion 7a of the third barrel 7 is fitted to the second guide bar 13 fixed to the first barrel 1. The second bearing portion 7b of the third barrel 7 is fitted to the third guide bar 14 fixed to the first barrel 1. Consequently, the third barrel 7 is supported to the first barrel 1 so as to be movable in the optical axis direction. Further, the screw portion 12 is fixed to the expanding portion 7c of the third barrel 7. The screw portion 12 comes into engagement with a lead screw 11a provided integratedly on the output shaft of the stepping motor 11 fixed to the first barrel 1. The third barrel 7 is driven by the stepping motor 11 in the optical axis direction.

The A/D converter 18 is electrically connected to an output terminal of the potentiometer 9 and an input terminal of the microcomputer 17. The position of the second photographing lens which is generated as a voltage value to the output terminal of the potentiometer 9 is transferred as a digital code to the microcomputer 17 from the A/D converter 18.

The stepping motor driving circuit 19 has first to fourth output terminals, first to third input terminals, and a power source terminal. The stepping motor driving circuit 19 will now be described with reference to FIGS. 4 and 5.

Figure 4:
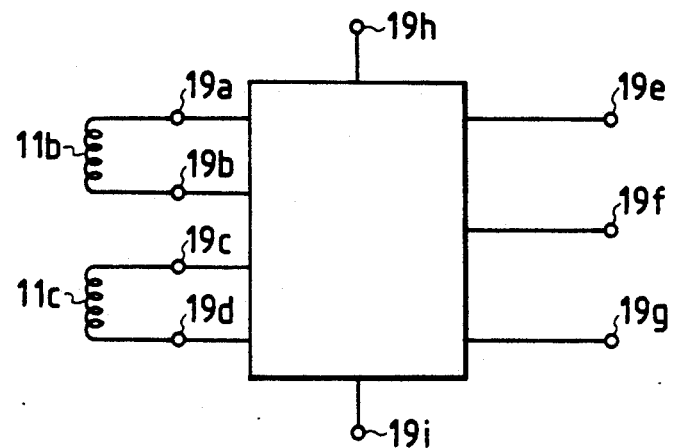
FIG. 4 is an explanatory diagram of input and output terminals of the standard stepping motor driving circuit.
Figure 5:
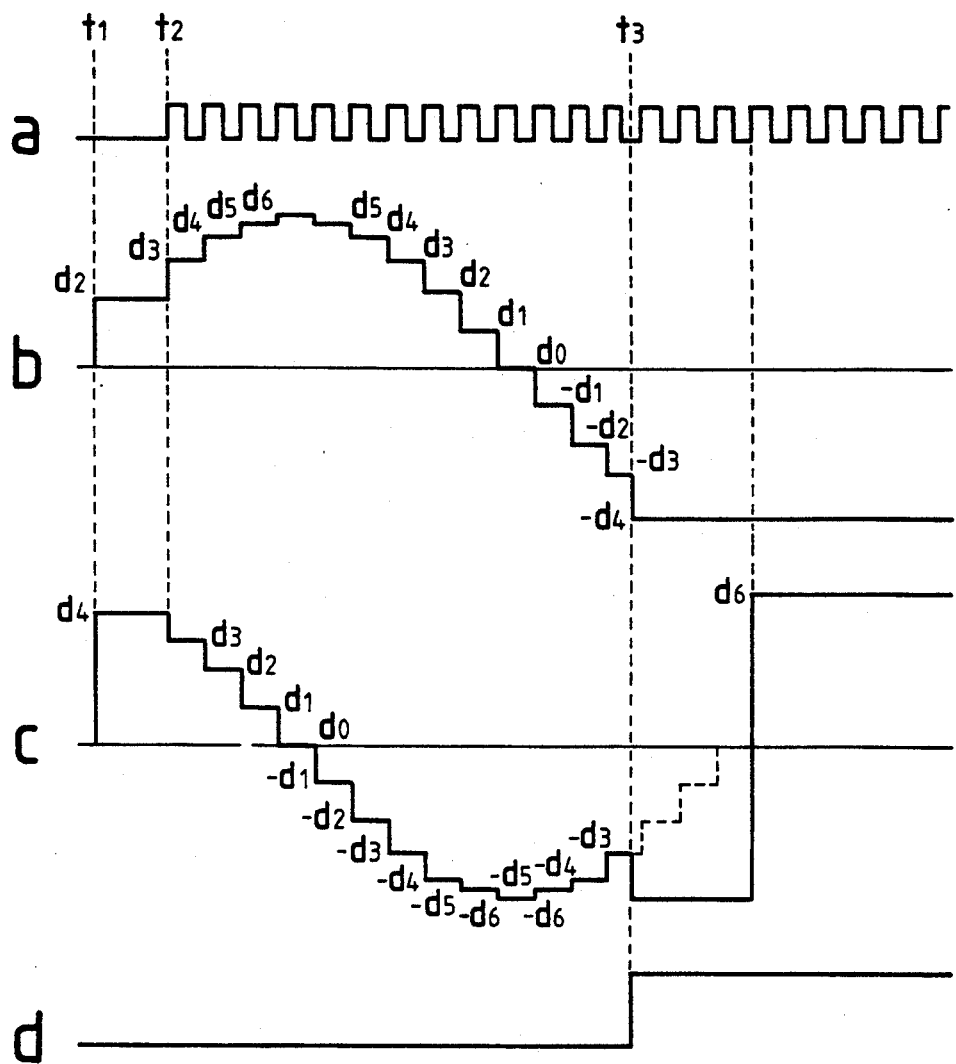
FIG. 5 is a timing chart for explaining the operation of the stepping motor driving circuit.

FIG. 4 is an explanatory diagram of the input and output terminals of the standard stepping motor driving circuit. FIG. 5 is a timing chart for explaining the operation of the stepping motor driving circuit.

In FIG. 4, reference numerals 19a, 19b, 19c and 19d denote first to fourth output terminals. The first and second output terminals 19a and 19b are connected to a first coil 11b of the stepping motor 11. The third and fourth output terminals 19c and 19d are connected to a second coil 11c of the stepping motor 11.

A first input terminal 19e is used to input a pulse serving as a driving command signal when the stepping motor is driven. Each time one pulse is supplied to the first input terminal 19e, a duty ratio of the current supply to the coil of the stepping motor 11 changes. A second input terminal 19f is used to determine the rotating direction of the stepping motor 11. For instance, assuming that an input signal of the second input terminal 19f is at the H level, the stepping motor 11 rotates clockwise. When it is at the L level, the stepping motor 11 rotates counterclockwise. A third input terminal 19g is used to set the duty ratio of the current supply to the stepping motor 11 to 100%. When the input signal of the third input terminal 19g is at the H level, the duty ratios of the current supply to the first and second coils of the stepping motor 11 are set to 100%. Reference numerals 19h and 19i denote power source terminals.

The operation of the stepping motor driving circuit will now be described with reference to FIG. 5.

In FIG. 5, a denotes a pulse signal which is supplied to the first input terminal 19e of the stepping motor driving circuit 19. b indicates a current supply to the first coil 11b of the stepping motor 11, in which the current supplying direction and the duty ratio are shown by an ordinate axis. c denotes a current supply to the second coil 11c of the stepping motor 11, in which the current supplying direction and the duty ratio are shown by an ordinate axis. In b and c, the sign indicates the current supplying direction. d shown in FIG. 5 denotes an input signal to the third input terminal 19g of the stepping motor driving circuit.

When the power source is turned on at time $t_1$, a current is supplied to the first coil 11b of the stepping motor 11 so that the current flows from the first output terminal 19a of the stepping motor driving circuit 19 to the second output terminal 19b at a duty ratio of $d_2$. Similarly, a current is supplied to the second coil 11c of the stepping motor 11 so that the current flows from the third output terminal 19c of the stepping motor driving circuit to the fourth output terminal 19b at a duty ratio of $d_4$. When the signal of the first pulse is supplied to the first input terminal 19e of the stepping motor driving circuit 19 at time $t_2$, the current supplying states to the first and second coils of the stepping motor change like $d_2 \rightarrow d_3$ and $d_4 \rightarrow d_3$, respectively. After that, the current supplying states to the first and second coils of the stepping motor change one stage by one each time one pulse is supplied to the first input terminal of the driving circuit 19.

When the input signal to the third input terminal 19g of the driving circuit 19 changes from the L level to the H level at time $t_3$, the current supplies to the first and second coils 11b and 11c of the stepping motor 11 to which the current supply of $-d_3$ has been executed so far are changed to $-d_6$ irrespective of the pulse input to the input terminal 19e of the driving circuit 19. Further, when the input signal to the third input terminal 19g of the driving circuit 19 is held at the L level at time $t_4$, a pulse to change the current supply to the second coil 11c of the stepping motor 11 from $d_0$ to $d_1$ is supplied to the first input terminal of the driving circuit 19, so that the current supply to the second coil 11c of the stepping motor 11 changes from $-d_6$ to $d_6$.

As described above, in the stepping motor driving circuit, when the input signal which is supplied to the third input terminal is at the L level, the duty ratio changes one stage by one every pulse. When the input signal which is given to the third input terminal is at the H level, the duty ratio is always set to 100%. When there are input pulses of the number such as to change the current supplying direction, the direction of the current supply is changed.

Figure 6:
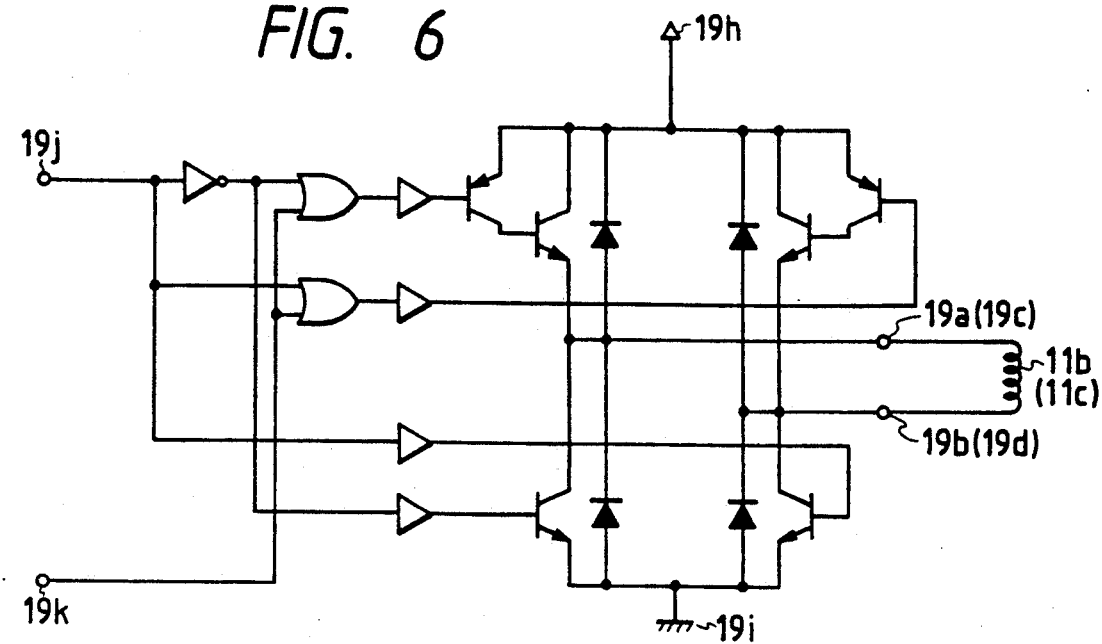
FIG. 6 is an explanatory diagram of the output stage of a conventional IC to drive the stepping motor.
Figure 7:
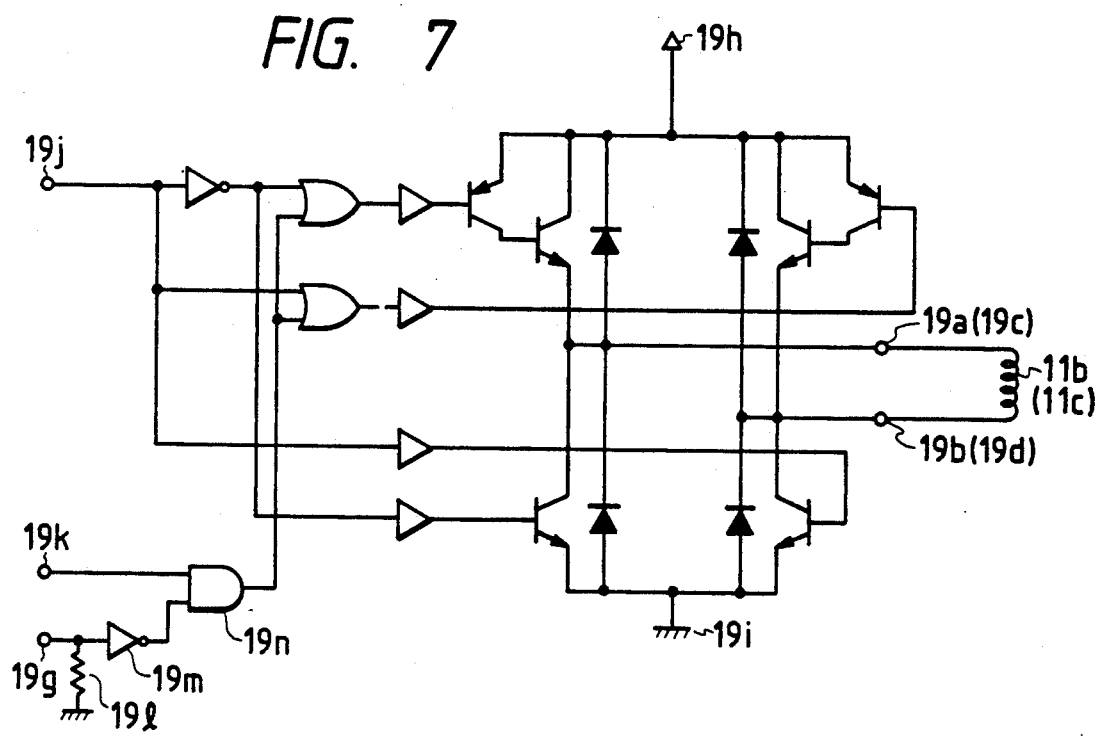
FIG. 7 is an explanatory diagram of the output stage of a stepping motor driving IC which is used in the embodiment.

The stepping motor driving circuit 19 which is used in the embodiment of the invention can be realized by, for instance, changing the input stage to a transistor bridge at the output stage of a circuit construction of TA8425H (Trade Name) as a commercially available stepping motor driving IC which operates as mentioned above from a circuit shown in FIG. 6 to a circuit shown in FIG. 7.

FIG. 6 shows a construction of the output stage of the stepping motor driving IC TA8425H. Reference numeral 19j denotes an input terminal to determine the current supplying direction to the coil. When the input terminal 19j is at the H level, the current flows in the coil 11b (or 11c) in such a direction from 19a (or 19c) to 19b (or 19d). When the input terminal 19j is at the L level, the current flows in the coil 11b (or 11c) in such a direction from 19b (19d) to 19a (19c). Reference numeral 19k denotes an input terminal to determine a duty ratio of a voltage which is applied to the coil. When the input signal to the input terminal 19k is at the H level, the current supply is shut off. When it is at the L level, the current is supplied in the direction which is decided by the input signal to the input terminal 19j.

FIG. 7 shows the output stage of the stepping motor driving circuit 19 which is used in the embodiment of the video camera according to the invention. The IC of FIG. 7 differs from the foregoing commercially available stepping motor driving IC with respect to a point that the input signal to the input terminal 19k to decide the duty ratio and the signal obtained by inverting the input signal to the third input terminal 19g of the stepping motor driving circuit by an inverter 19m are connected to input terminals of an AND circuit 19n. The third input terminal 19g of the stepping motor driving circuit 19 is pulled down by a resistor 19l.

According to the stepping motor driving circuit 19 with the circuit construction shown in FIG. 7, when the input signal to the third input terminal 19g is at the H level, the current is supplied to the coil 11b (11c) of the stepping motor 11 at a duty ratio of 100%. When it is at the L level, the current is supplied to the coil 11b (11c) of the stepping motor 11 at the same duty ratio as that of the pulse which is supplied to the input terminal 19k.

In FIG. 1, the contrast detection circuit 20 detects a contrast value from the image signal from the CCD 15 and transmits to the microcomputer 17. The DC motor driving circuit 21 drives or stops the DC motor 8 in response to a command from the microcomputer 17.

Although the embodiment of the video camera according to the invention has a recording deck section and the like in a manner similar to the well-known video camera, its construction is not particularly limited. Therefore, their descriptions and drawings are omitted here.

The operation of the embodiment according to the invention will now be described with reference to FIGS. 1, 2 and 3 with respect to the control operation of the focusing lens in the zooming operation as an example.

In the lens system of what is called a rear focusing type as shown in FIG. 1, since the focusing position changes by the zooming, the tracking operation of the focusing lens is complicated and the tracking speed also largely varies depending on a situation.

FIG. 2 is a diagram showing waveforms which are applied to the input terminals of the stepping motor driving circuit 19 when the stepping motor is driven by a high driving frequency in the video camera according to the embodiment and also shows a timing chart of the output waveforms. In FIG. 2, a denotes an input waveform of the first input terminal 19c; b an input waveform of the third input terminal 19g; c a current supply to the first coil 11b of the stepping motor 11 in which the current supplying direction and the duty ratio are shown by an ordinate axis; and d a current supply to the second coil 11c of the stepping motor 11 in which the current supplying direction and the duty ratio are shown by the ordinate axis.

FIG. 3 is a flowchart for driving the stepping motor in the zooming operation according to the embodiment.

In FIG. 3, when a zoom switch (not shown in FIG. 1) is turned on in step S1, the microcomputer 17 detects the turn-on of the zoom switch and the processing routine advances to step S2. In step S2, the position of the second photographing lens 3 as a magnification changing lens is first detected by detecting the output voltage of the potentiometer 9 through the A/D converter 18.

As is well known, in the lens system of the rear focusing type, the moving locus of the focusing lens is determined in accordance with the positions of the zoom lens and the focusing lens. It is necessary to control the speed of the focusing lens so as to trace the locus. In recent years, there is used what is called an electronic cam system which has an ROM in which the driving speed of the focusing lens has been stored while the positions of the zoom lens and the focusing lens are used as addresses and which electronically controls the position of the focusing lens instead of mechanically controlling. In the zoom lens of the electronic cam type, when the zooming is executed by moving the magnification changing lens 3 at a constant speed, it is necessary to change the driving speed of the focusing lens 5 in accordance with the position of the lens 3. For this purpose, the microcomputer 17 sets a speed necessary to move the focusing lens 5, that is, a driving frequency $f_{dr}$ of the pulse which is supplied to the first input terminal 19c of the stepping motor driving circuit 19 (step S3). Subsequently, the microcomputer 17 checks to see if the set frequency $f_{dr}$ is equal to or higher than a predetermined frequency $f_a$ which has previously been stored in the microcomputer or not (step S4). The frequency $f_a$ denotes a threshold value of the speed at which the driving torque of the focusing lens lacks in the case of the smooth microstep-like driving waveform mentioned above. When the set frequency $f_{dr}$ is lower than the predetermined frequency $f_a$, the focusing lens can be driven in a microstep manner, so that step S5 follows. In step S5, the microcomputer 17 sets an output signal of an output terminal $OUT_1$ to the third input terminal 19g of the stepping motor driving circuit 19 to the L level. In step S6, the driving direction is set and the output signal to the second input terminal 19f of the driving circuit 19 is set to the H or L level in accordance with the state of the zoom switch and, thereafter, the generation of the pulse to the first input terminal 19e of the driving circuit 19 is started. In this instance, the DC motor driving circuit 21 also starts the current supply to the DC motor 8, so that the zooming operation is started.

In the above case, since the output signal of the output terminal $OUT_1$ to the third input terminal 19g of the driving circuit 19 is at the L level, an almost smooth current supply whose duty ratio changes step by step from the activation is executed to the first and second coils of the stepping motor 11.

In step S4, when the frequency $f_{dr}$ set by the position of the magnification changing lens 3 is equal to or larger than the predetermined frequency $f_a$, step S7 follows and the microcomputer 17 sets the output signal of the output terminal $OUT_1$ to the third input terminal 19g of the driving circuit 19 to the H level at a timing $T_a$ in the timing chart shown in FIG. 2. In step S8, the microcomputer 17 subsequently sets the driving direction and sets the output signal to the second input terminal 19f of the driving circuit 19 to the H or L level in accordance with the zoom switch and, thereafter, the generation of the pulse to the first input terminal 19e of the driving circuit 19 is started. In this instance, the DC motor driving circuit 21 also starts the current supply to the DC motor 8, thereby starting the zooming operation at a timing $T_b$ in the timing chart shown in FIG. 2.

In the next step S9, the microcomputer 17 counts the number of pulses which are supplied to the stepping motor driving circuit. When the number of pulses generated reaches a predetermined pulse number $P_a$ which has previously been stored in the microcomputer 17, step S10 follows. In step S10, the output signal of the output terminal $OUT_1$ to the third input terminal 19g of the driving circuit 19 is set to the L level at a timing $T_c$ in the timing chart shown in FIG. 2. After that, the almost smooth current supply whose duty ratio changes step by step is performed to the first and second coils of the stepping motor 11.

That is, the stepping motor driving circuit 19 sets the stepping motor driving frequency in correspondence to the position of the magnification changing lens 3. When the set stepping motor driving frequency is equal to or higher than a predetermined frequency, the rectangular waveform output of a large duty ratio is supplied to the stepping motor 11 for a predetermined period of time from the start of the actuation of the stepping motor 11. After the elapse of such a predetermined period of time, the output of an almost smooth waveform of a set frequency corresponding to the position of the magnification changing lens 3 is supplied to the stepping motor.

By the above construction and control, for the lens 3 which is driven at a constant speed, the stepping motor 11 can drive the focusing lens 5 by the necessary initial driving force and at the set speed corresponding to the position of the lens 3. It is accordingly possible to use a small stepping motor of a small electric power consumption.

The microcomputer 17 constructs control means for controlling the stepping motor driving circuit 19 in correspondence to the position of the photographing lens.

According to the invention as described above, when the movement of the position of the photographing lens on the optical axis is started by the stepping motor, the stepping motor driving circuit supplies the rectangular waveform output of a large duty ratio to the stepping motor for the predetermined period of time from the start of the actuation of the stepping motor when the stepping motor driving frequency set in correspondence to the position of the photographing lens is equal to or larger than the predetermined frequency. After the elapse of the predetermined period of time, the almost smooth waveform output of the frequency corresponding to the position of the photographing lens is supplied to the stepping motor.

By the above operation, the stepping motor generates an enough large torque upon actuation and moves the photographing lens at a necessary driving speed. Thus, a small stepping motor of a small electric power consumption can be used, and it is possible to provide the image pickup apparatus which can suppress the occurrence of the vibration and noises due to the stepping motor and can prevent vibration and noise from becoming an obstacle in the recording.

What is claimed is:
1. An image pickup apparatus comprising:
   (A) a lens;
   (B) a stepping motor to drive said lens;
   (C) first control means for determining a driving frequency of a driving signal of said stepping motor; and
   (D) second control means for variably changing a driving waveform of the driving signal in accordance with whether the driving frequency determined by said first control means is equal to or higher than a predetermined frequency or not.
2. An apparatus according to claim 1, wherein said second control means variably changes a duty ratio of the driving waveform of the driving signal of said stepping motor.
3. An apparatus according to claim 2, wherein said second control means sets the driving waveform into a first smooth driving waveform in which the duty ratio of the driving signal continuously changes when said driving frequency is lower than the predetermined value and sets into a second driving waveform in which a driving waveform of a predetermined duty ratio continues for at least a predetermined time or longer when the driving frequency is equal to or higher than the predetermined value.
4. An apparatus according to claim 3, wherein when said driving frequency is equal to or higher than the predetermined value, said second control means sets the driving frequency into the first driving waveform after the driving waveform of a predetermined duty ratio was continuously applied for at least the predetermined time or more.
5. An apparatus according to claim 1, wherein said lens is a focusing lens.

6. An apparatus according to claim 5, further having a zoom lens, and wherein said first control means determines the driving frequency of the stepping motor on the basis of the positions of the zoom lens and the focusing lens.

7. A video camera comprising:
(A) a photographing lens;
(B) a motor to drive said photographing lens;
(C) first control means for determining a driving speed of said motor on the basis of the operating position of the photographing lens; and
(D) second control means for variably changing a driving waveform of a driving signal of said motor in accordance with whether the driving speed determined by the first control means is equal to or higher than a predetermined speed or not.

8. A video camera according to claim 7, wherein said second control means variably changes a duty ratio of the driving waveform of the driving signal of the motor.

9. A video camera according to claim 8, wherein said second control means sets a driving waveform into a first smooth driving waveform in which a duty ratio of the driving signal continuously changes when said driving speed is lower than the predetermined value and into a second driving waveform in which the driving waveform of a predetermined duty ratio continues for at least a predetermined time or longer when the driving speed is equal to or higher than the predetermined value.

10. A video camera according to claim 9, wherein when the driving speed is equal to or higher than the predetermined value, said second control means sets the driving waveform into the first driving waveform after the driving waveform of a predetermined duty ratio was continuously applied for at least a predetermined time or longer.

11. A video camera comprising:
(A) a zoom lens;
(B) a focusing lens;
(C) a stepping motor to drive the focusing lens;
(D) a table in which a driving speed of the focusing lens according to the positions of the zoom lens and the focusing lens has been stored;
(E) speed control means for selecting the driving speed of the focusing lens from said table on the basis of the positions of the zoom lens and the focusing lens; and
(F) driving characteristics control means for variably changing a driving waveform of the driving signal in accordance with whether the driving speed determined by said first control means is equal to or higher than a predetermined value or not.

12. A video camera according to claim 11, wherein the driving speed of said focusing lens has been stored in said table as information of a driving frequency of the stepping motor.

13. A video camera according to claim 12, wherein said driving characteristic control means variably changes a duty ratio of the driving waveform of the driving signal of the stepping motor.

14. A video camera according to claim 13, wherein said driving characteristics control means sets the driving waveform into a first smooth driving waveform in which a duty ratio of the driving signal continuously changes at a predetermined period when the driving frequency of the stepping motor is less than the predetermined value and into a second driving waveform in which the duty ratio continuously changes at a predetermined period after the driving waveform of the predetermined duty ratio continued for at least a predetermined period of time when the driving frequency is equal to or higher than the predetermined value.

15. A video camera according to claim 11, further having recording means.

16. A camera apparatus comprising:
(A) a lens;
(B) a motor to drive said lens;
(C) first control means for determining a driving frequency of a driving signal of said motor; and
(D) second control means for variably changing a voltage waveform of the driving signal in accordance with whether the drive frequency determined by said first control means is equal to or higher than a predetermined frequency or not.

17. An apparatus according to claim 16, wherein said second control means variably changes a duty ratio of the driving waveform of the driving signal of said motor.

18. An apparatus according to claim 17, wherein said second control means sets the driving waveform into a first smooth driving waveform in which the duty ratio of the driving signal continuously changes when said driving frequency is lower than the predetermined value and sets into a second driving waveform in which a driving waveform of a predetermined duty ratio continues for at least a predetermined time or longer when the driving frequency is equal to or higher than the predetermined value.

19. An apparatus according to claim 18, wherein when said driving frequency is equal to or higher than the predetermined value, said second control means sets the driving frequency into the first driving waveform after the driving waveform of a predetermined duty ratio is continuously applied for at least the predetermined time or longer.

* * * * *